(12) United States Patent
Kauffman et al.

(10) Patent No.: US 8,850,552 B2
(45) Date of Patent: Sep. 30, 2014

(54) USE OF DATA LINKS FOR AERONAUTICAL PURPOSES WITHOUT COMPROMISING SAFETY AND SECURITY

(75) Inventors: Donald C. Kauffman, Laurel, MD (US); Thomas D. Judd, Woodinville, WA (US); Michael L. Olive, Cockeysville, MD (US)

(73) Assignee: Honeywell International Inc., Morristown, NJ (US)

( * ) Notice: Subject to any disclaimer, the term of this patent is extended or adjusted under 35 U.S.C. 154(b) by 1318 days.

(21) Appl. No.: 12/253,710

(22) Filed: Oct. 17, 2008

(65) Prior Publication Data

US 2009/0133112 A1 May 21, 2009

Related U.S. Application Data

(60) Provisional application No. 60/989,760, filed on Nov. 21, 2007, provisional application No. 60/990,544, filed on Nov. 27, 2007.

(51) Int. Cl.
- *G06F 9/00* (2006.01)
- *G06F 11/07* (2006.01)
- *H04L 29/06* (2006.01)

(52) U.S. Cl.
CPC ........ *G06F 11/0739* (2013.01); *H04L 63/1408* (2013.01)
USPC ............. 726/11; 709/206; 709/224; 709/225; 709/238; 709/245; 370/277; 370/392; 370/395.3; 713/151

(58) Field of Classification Search
CPC ............ H04L 63/1408; G06F 11/0739; B64D 2045/0045
USPC ........................................... 726/11
See application file for complete search history.

(56) References Cited

U.S. PATENT DOCUMENTS

| | | | | |
|---|---|---|---|---|
| 5,798,726 | A * | 8/1998 | Schuchman et al. | 342/37 |
| 6,760,778 | B1 | 7/2004 | Nelson et al. | |
| 6,801,764 | B2 * | 10/2004 | Purpura | 455/404.1 |
| 7,082,124 | B1 * | 7/2006 | Katukam | 370/357 |
| 7,257,628 | B2 * | 8/2007 | Liskov et al. | 709/223 |
| 7,742,487 | B2 * | 6/2010 | Bugenhagen | 370/401 |
| 7,860,642 | B2 * | 12/2010 | Sandell et al. | 701/120 |
| 8,046,821 | B2 * | 10/2011 | Nguyen | 726/2 |
| 8,139,581 | B1 * | 3/2012 | Mraz et al. | 370/392 |

(Continued)

FOREIGN PATENT DOCUMENTS

| | | |
|---|---|---|
| FR | 2862398 | 5/2005 |
| FR | 2901442 | 11/2007 |

(Continued)

OTHER PUBLICATIONS

Google Patent search.*

(Continued)

*Primary Examiner* — Arvin Eskandarnia
(74) *Attorney, Agent, or Firm* — Fogg & Powers LLC

(57) ABSTRACT

A method of ensuring secure and cost effective communication of aeronautical data to and from an aircraft is provided. The method includes uplinking air-ground aircraft data communications via an aeronautical safety data link and downlinking air-ground aircraft data communications via a consumer data link separated from the aeronautical safety data link by a one-way firewall.

24 Claims, 7 Drawing Sheets

(56) References Cited

U.S. PATENT DOCUMENTS

| | | | |
|---|---|---|---|
| 2002/0045974 A1 | 4/2002 | Heppe et al. | |
| 2002/0160773 A1 | 10/2002 | Gresham et al. | |
| 2003/0074413 A1* | 4/2003 | Nielsen et al. | 709/206 |
| 2004/0088383 A1 | 5/2004 | Dillon | |
| 2005/0070320 A1* | 3/2005 | Dent | 455/516 |
| 2005/0071650 A1* | 3/2005 | Jo et al. | 713/188 |
| 2005/0113069 A1* | 5/2005 | Knauerhase et al. | 455/411 |
| 2005/0187677 A1* | 8/2005 | Walker | 701/16 |
| 2006/0008087 A1* | 1/2006 | Olive | 380/255 |
| 2006/0040612 A1 | 2/2006 | Min | |
| 2006/0080451 A1* | 4/2006 | Eckert | 709/230 |
| 2006/0120395 A1* | 6/2006 | Xing et al. | 370/431 |
| 2007/0067837 A1* | 3/2007 | Schuster | 726/11 |
| 2007/0088467 A1* | 4/2007 | Knotts | 701/14 |
| 2007/0123258 A1* | 5/2007 | Sawyer | 455/436 |
| 2007/0174428 A1* | 7/2007 | Lev Ran et al. | 709/218 |
| 2007/0218871 A1* | 9/2007 | Bonner | 455/406 |
| 2008/0049781 A1* | 2/2008 | Bugenhagen | 370/465 |
| 2008/0086554 A1* | 4/2008 | Royalty | 709/224 |
| 2008/0086637 A1* | 4/2008 | Royalty | 713/168 |
| 2008/0192629 A1* | 8/2008 | Chari | 370/230 |
| 2008/0282336 A1* | 11/2008 | Diaz Cuellar et al. | 726/11 |
| 2009/0012663 A1* | 1/2009 | Mead et al. | 701/14 |
| 2009/0058682 A1* | 3/2009 | True | 340/971 |
| 2009/0132330 A1* | 5/2009 | Shaw et al. | 705/9 |
| 2010/0023247 A1* | 1/2010 | Sandell et al. | 701/120 |

FOREIGN PATENT DOCUMENTS

| | | |
|---|---|---|
| GB | 2433006 | 6/2007 |
| WO | 0137570 | 5/2001 |
| WO | 2008045154 | 4/2008 |

OTHER PUBLICATIONS

ACM search.*

IP.com Search.*

European Patent Office, "European Search Report", Apr. 7, 2010, Published in: EP.

Feng et al., "Target: Two-Way Web Service Router Gateway", Sep. 1, 2006, pp. 629-636, Publisher: IEEE.

Roy, Aloke, "Secure Aircraft Communications Addressing and Reporting System (ACARS)", "The 20th Digital Avionics Systems Conference Proceedings", Oct. 14, 2001, vol. 2, Publisher: IEEE, Published in: Daytona Beach, FL, USA.

European Patent Office, "Communication of a Notice of Opposition", "from Foreign Counterpart of U.S. Application", Jun. 12, 2012, pp. 130, Published in: EP.

Roegel et al, "AIRCOMclever: System Overview Document", Sep. 21, 2006, pp. 1-35, Publisher: SITA CNS Business Development/SITA Air Traffic Solutions.

"Mobile Communication Network Architecture (MCNA) Architecture Report", Jul. 25, 2005, pp. 1-125, Publisher: Boeing.

Yang et al, "Design of a Distributed Computer Security Lab", "CCSC: Rocky Mountain Conference", 2004, pp. 332-347.

European Patent Office, "Notice of Opposition", "from Foreign Counterpart of U.S. Appl. No. 12/253,710", Jul. 18, 2013, pp. 1-11, Published in: EP.

* cited by examiner

USE OF DATA LINKS FOR AERONAUTICAL PURPOSES WITHOUT COMPROMISING SAFETY AND SECURITY

This application claims the benefit of U.S. Provisional Application No. 60/989,760, filed on Nov. 21, 2007, and U.S. Provisional Application No. 60/990,544, filed on Nov. 27, 2007, which are incorporated herein by reference in their entirety.

BACKGROUND

Traditional aeronautical data links are relatively expensive and are becoming more congested. At the same time, the FCC recently auctioned licenses for broadband cellular data services explicitly for use to/from aircraft. The primary intention of this new licensed band is to provide Internet access to aircraft passengers. There are also other broadband services provided to aircraft passengers via SATCOM data links. WiFi (IEEE 802.11) access points at airport gates also provide broadband services to aircraft. These new broadband data links are attractive to airlines for use as cockpit communications data links since they would likely result in lower operating costs for data link services. However, the problem of safety and security of cockpit communications has been a significant technological challenge. The cockpit data communications are required for the safe operation of the aircraft. However, the problem of safety and security of the cockpit communications has been a significant technology challenge, since these cockpit data communications are required for the safe operation of the aircraft.

SUMMARY

The present application relates to a method of ensuring secure and cost effective communication of aeronautical data to and from an aircraft. The method includes uplinking air-ground aircraft data communications via an aeronautical safety data link and downlinking air-ground aircraft data communications via a consumer data link separated from the aeronautical safety data link by a one-way firewall.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Like reference characters denote like elements throughout figures and text.

DETAILED DESCRIPTION

Figure 1:
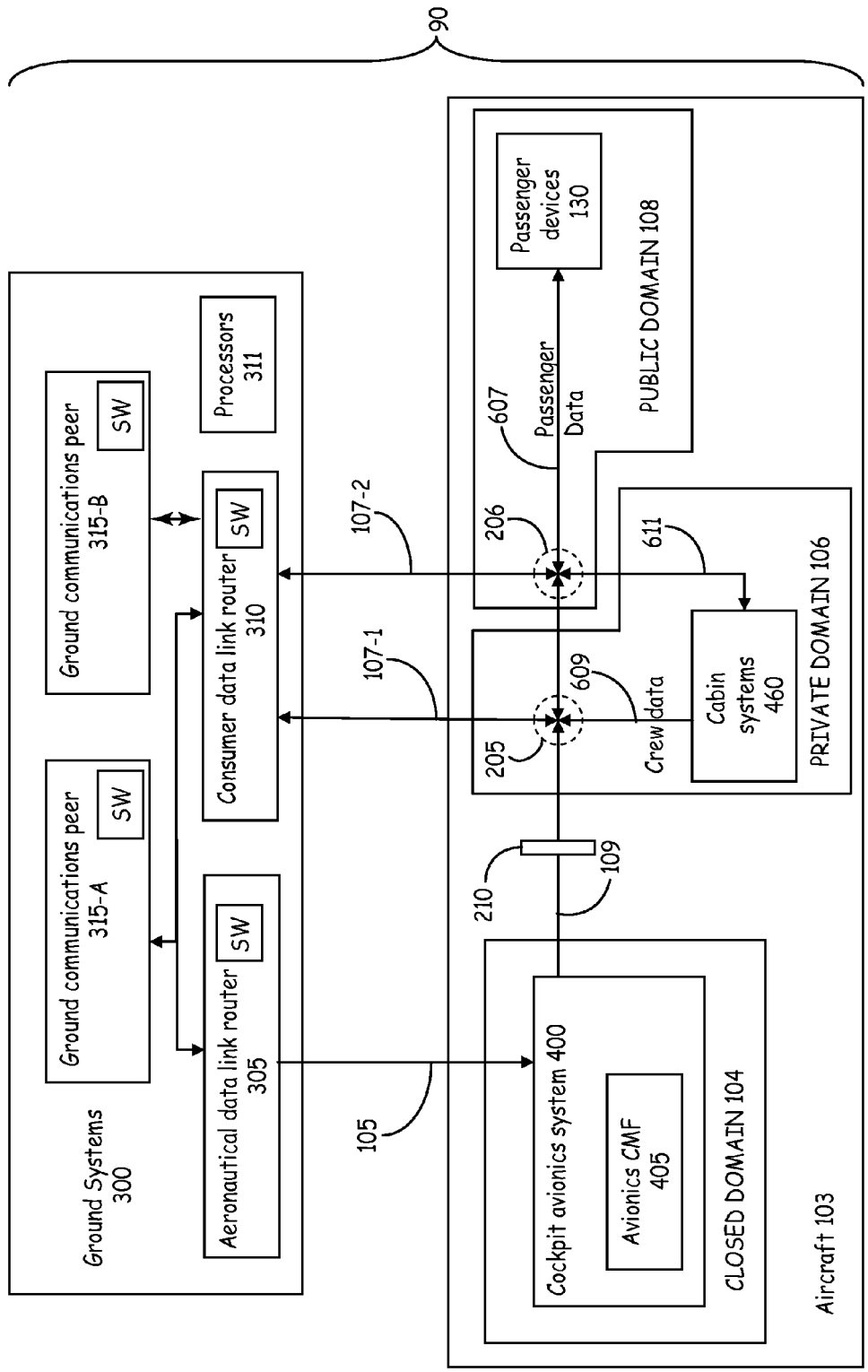
FIG. 1 shows a block diagram of an aeronautical communication system in accordance with one embodiment of the present invention.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

For the reasons stated above and for other reasons stated below which will become apparent to those skilled in the art upon reading and understanding the present specification, there is a need in the art for a safe and secure method of exploiting consumer data links for aeronautical purposes. Specifically, it is desirable to ensure that a passenger domain generated message sent from an aircraft or a message sent from a ground based system to communicate with a passenger device on the aircraft does not intentionally or unintentionally find its way into the cockpit avionics systems. The cockpit avionics systems include communication, navigation, and surveillance systems (CNS), communications management function (CMF), and aircraft operations and control avionics. It is desirable to provide this protection of the cockpit avionics system without the use of very elaborate protections or firewalls, since such protections or firewalls can be expensive to install and maintain. Since cockpit avionics systems send messages over relatively expensive, low bandwidth aeronautical data links traditionally used for sending safety-of-flight and/or critical safety information, it is desirable for the cockpit avionics systems to have access to lower cost, high bandwidth data links. Access to lower cost, high bandwidth data links will enable aircraft operators to send larger downlink messages cost effectively. This may enable the aircraft operators to implement new procedures which reduce their cost of operating the aircraft.

Embodiments of the present invention send outbound (downlink) messages via the consumer data link and receive the inbound (uplink) messages via traditional aeronautical data links to which the passengers and the public, in general, do not have ready access via consumer electronic devices. Embodiments use special routing logic and a simple one-way firewall to route and control the message traffic to and from the appropriate data links. Moreover, in embodiments, simple and foolproof firewalls are used for allowing messages to pass in only one direction (unidirectionally) between numerous domains which utilize the same bearer data link network. By using the consumer data link for downlink only messages, the risk of intentional or unintentional electronic intrusion into the cockpit avionics systems by unauthorized persons or systems can be virtually eliminated. With this approach, the aircraft operators can receive the economic benefit of using the consumer data link for a portion of the cockpit domain message traffic. With the addition of simple routing protocols in the avionics and ground based data link communications management functions, uplinks to the aircraft can be sent through traditional safety communications data link to the cockpit avionics, thereby providing the safety and security for messages entering the cockpit avionics from outside of the cockpit domain boundary.

In embodiments, cockpit data link applications such as user messaging, system messaging, and application level information security logically reside above the multi-data link routers described herein and therefore are not impacted by the embodiments. Message acknowledgement protocols are addressed at the proper level of the protocol stack; some may occur at the application level of the protocol stack, others can occur lower in the stack. For example, with an ARINC Communications Addressing and Reporting System (ACARS) protocol, ARINC 618/620, the ACARS router is configured to expect an acknowledgement for some types of messages. Therefore, the communications management function expects the acknowledgement via the aeronautical data link in response to a downlink sent via the consumer data link. It is also possible that other cockpit avionics systems may also expect an application level acknowledgement. This application level acknowledgement could also be sent via the aeronautical data link. Therefore, the ground side router also needs to send the acknowledgement via the aeronautical data link even though the message was received via the consumer data link. In another embodiment, the ground communications peer 315-A, shown in FIG. 1, sends an uplink message to the closed domain 104 of aircraft 103 requesting that information be sent via downlink to the ground system peer 315-A. Upon receipt of this message, the cockpit avionics system 400 initiates a downlink to ground communications peer 315-A via the consumer data link 107.

Another aspect of the invention is to determine which data link to use for downlinks based on the type of message. For example, maintenance data collected from avionics may be large and would benefit significantly from the consumer data link but would only require a small uplink message to the aircraft to acknowledge receipt of the large message by the ground system. Other message types might consist of large uplinks, such as weight and balance and flight plan information from airline operations to the aircraft. It might be simpler to handle the large uplinks as well as the small downlink acknowledgement via the aeronautical safety data link. Since in this case the downlink is relatively small, little benefit would be obtained by using the consumer data link for the downlink acknowledgement.

Still another aspect of the invention is the concept of storing non-time critical messages on the aircraft until the aircraft can access the lowest cost data link. In this scenario, non-time critical maintenance data, for example, would be stored on the aircraft until the aircraft arrived at a gate with access to at least one of broadband, 802.11 (WiFi), and next generation communication systems. The large volume of downlink data is then transmitted over the consumer data link and the acknowledgement is uplinked to the aircraft via the aeronautical safety data link.

FIG. 1 shows a block diagram of an aeronautical communication system 90 in accordance with one embodiment of the present invention. The aeronautical communication system 90 includes ground systems 300 communicatively coupled to a cockpit avionics system 400 in an aircraft 103.

The aeronautical communication system 90 ensures secure and cost effective communication of aeronautical data to and from the aircraft 103. Specifically, the aeronautical communication system 90 uplinks air-ground aircraft data communications via an aeronautical safety data link 105 and downlinks air-ground aircraft data communications via a consumer data link, such as consumer data link 107-1 or 107-2. The consumer data links 107(1-2) are separated from the aeronautical safety data link 105 by a one-way firewall 210.

As defined herein aeronautical data includes any data transmitted, received, processed, stored, used or in any way manipulated by an aircraft. As defined herein air-ground aircraft data communications (aeronautical data), include aeronautical safety/security data, cabin-crew data, and/or passenger data, that is exchanged between an aircraft and any mobile or fixed systems. As defined herein, aeronautical safety/security data (also referred to herein as safety/security data) includes any aeronautical data related to safety and regularity of flight.

As defined herein the aeronautical safety data link is any communications link licensed and/or regulated to exchange aeronautical safety/security data between an aircraft and any mobile or fixed systems. As defined herein the consumer data link is any aircraft communications link not classified as an aeronautical safety data link, which exchanges data such as, but is not limited to, in-flight entertainment, passenger support, and airline administrative data.

The ground systems 300 are typically part of a ground station. The ground systems 300 include a consumer data link router 310 and aeronautical data link router 305 that are each communicatively coupled to ground communications peers represented generally as ground communications peer 315-A and ground communications peer 315-B to indicate that the ground communications peer can have multiple instantiations. The aeronautical data link router 305 is also referred to herein as the "aeronautical safety data link router 305." At least one of the consumer data link router 310, the aeronautical data link router 305, and the ground communications peers 315-A and/or 315-B includes software (SW) (including protocols) that are executable by processors 311 in the ground systems 300 to perform the functions described herein as being performed by the ground systems 300. As shown in FIG. 1, the ground communications peer 315-B is communicatively coupled to the consumer data link router 310 while the ground communications peer 315-A is communicatively coupled to both the aeronautical data link router 305 and the consumer data link router 310. Other configurations are possible.

The aircraft 103 has a closed domain 104 that includes the cockpit avionics system 400, a private domain 106 that includes cabin systems 460, and a public domain 108 that includes passenger devices 130. The one-way firewall 210 is between the closed domain 104 and both the private domain 106 and the public domain 108. The one-way firewall 210 is communicatively coupled to pass the safety/security data output from the closed domain 104 while preventing data from entering the closed domain 104, when the data is uplinked on the consumer data links 107(1-2) to the private domain 106, and/or the data is uplinked on the consumer data links 107(1-2) to the public domain 108.

The cockpit avionics system 400 includes the avionics communications management function (CMF) 405. The avionics communications management function 405 generates safety/security data, sends safety/security data, receives safety/security data, and routes safety/security data to and from other aircraft operations and control avionics. The avionics communications management function 405 executes downlink routing protocols to send safety/security data from the closed domain 104 of the aircraft 103 to the ground systems 300 via a consumer data link 107-1 and/or consumer data link 107-2. More than two consumer data links can be implemented to send safety/security data from the closed domain 104 of the aircraft 103 to the ground systems 300. In one implementation of this embodiment, the aircraft may only have one consumer data link 107-1 or 107-2. The avionics communications management function 405 also executes uplinking routing protocols to receive safety/security data at the closed domain 104 via an aeronautical safety data link 105. In one implementation of this embodiment, at least some of the messages originate and end in the avionics communications management function 405. In another implementation of this embodiment, at least some of the messages originate and end in external line replaceable units, such as a flight management computer (FMC), a central maintenance computer (CMC), and/or an avionics control and maintenance system. In yet another implementation of this embodiment, the avionics communications management function 405 is in an integrated box.

The private domain 106 includes cabin systems 460 which generate and consume cabin-crew data. The cabin-crew data includes data sent to and from the ground systems 300. The cabin-crew data also includes internal aircraft data communications required to communicate between crew devices 126 within the private domain 106. As defined herein "cabin-crew data" is data generated by the cabin systems 460 and received from the ground systems 300 by the cabin systems 460. As shown in FIG. 1, the cabin-crew data is input/output via one or more consumer data link 107(1-2)

The public domain 108 includes passenger devices 130 that generate passenger data or consumer data (including in flight entertainment data). As defined herein "passenger data" is generated by the passenger devices 130 or received at passenger devices 130. The passenger devices include, but are not limited to, consumer electronic devices. Passenger data generated at the passenger devices 130 is sent to the ground systems 300, to satellites (not shown), or to other consumer communication links. Passenger data received at the passenger devices 130 is received from the ground systems 300, from satellites (not shown), or from other consumer communication links.

As shown in FIG. 1, the passenger data is sent via the one or more consumer data link 107(1-2) from the private domain 106. In another implementation of this embodiment, the passenger data is sent via the consumer data link 107(1-2) from the public domain 108. In yet another implementation of this embodiment, the passenger data is sent via the consumer data link 107(1-2) from both the public domain 108 and from the private domain 106.

The one-way firewall 210 in the aeronautical communication system 90 permits communication between the aircraft 103 and the ground systems 300 as described herein for operating costs that are less than or equal to the operating costs of currently available aeronautical safety data links. The one-way firewall 210 passes safety/security data being output from the closed domain 104. The one-way firewall 210 denies throughput to: data uplinked on the consumer data link 107(1-N); consumer data or passenger data generated within the public domain 108 and/or the private domain 106; internal aircraft data communications (i.e., cabin-crew data) that are transmitted within the private domain 106; and internal aircraft data communications (i.e., passenger data) that are transmitted within the public domain 108. This denial of throughput by the one-way firewall 210 prevents potentially damaging data from entering the closed domain 104, while the safety/security data is downlinked on a consumer data link 107(1-N). In some embodiments, the consumer data links 107-1 and/or 107-2 are broadband consumer data links.

As shown in FIG. 1, the safety/security data is output from the closed domain 104 via the communication link 109 and one-way firewall 210. The cabin-crew data is output from the private domain 106 via communication link 609. The passenger data is output from the public domain 108 via communication link 607. The safety/security data on the communication link 109 is shown to combine with the cabin-crew data/passenger data on the communication link 609 at a routing region represented generally at 205 within the private domain 106. The communication links and communication devices operating within the routing region 205 are shown in detail in FIG. 3. The cabin-crew data output via the communication link 611 is shown to combine with the passenger data that is output via the communication link 607 at a routing region represented generally at 206 within the public domain 108. The communication links and communication devices operating within the routing region 206 are shown in detail in FIG. 4. In yet another implementation of this embodiment, the safety/security data is output from the closed domain 104 via the communication link 109 and one-way firewall 210 and is sent to the ground systems 300 via one or more of the communication links 107(1-2) without any cabin-crew data or passenger data.

In one implementation of this embodiment, the routing regions 205 and 206 include some common communication links and communication devices. In another implementation of this embodiment, the routing regions 205 and 206 include communication links and communication devices that are distinct from each other. In yet another implementation of this embodiment, the routing regions 205 and 206 are both in the private domain 106. In yet another implementation of this embodiment, the routing regions 205 and 206 are both external to the private domain 106 and the public domain 108.

In standards documents, such as ARINC 664 and ARINC 811, a four-domain reference model is standardized to include: aircraft control domain (ACD), airline information services domain (AISD), passenger information and entertainment services domain (PIESD), and passenger-owned devices domain (PODD). The closed domain 104 described herein maps to the aircraft control domain. The private domain 106 described herein maps to airline information services domain and the passenger information and entertainment services domain. The public domain 108 described herein maps to passenger-owned devices domain.

The communication links (such as communication links 109, 609, 611, and 607) internal to the aircraft 103 can be wireless communication links (for example, a radio-frequency (RF) communication link) and/or wired communication links (for example, an optical fiber or copper wire communication link).

Figure 2:
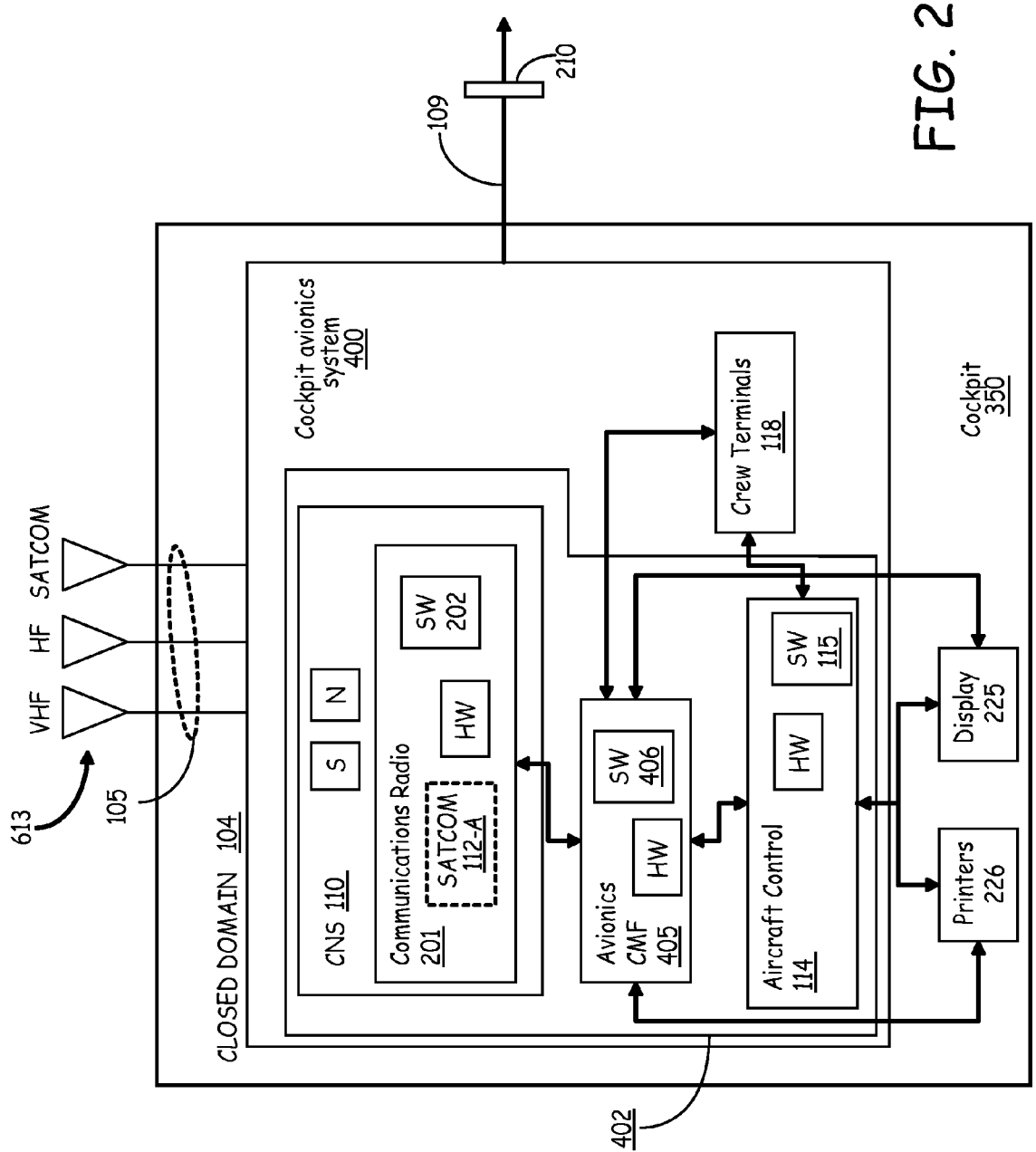
FIG. 2 shows a block diagram of a closed domain in an aeronautical communication system in accordance with one embodiment of the present invention.
Figure 3:
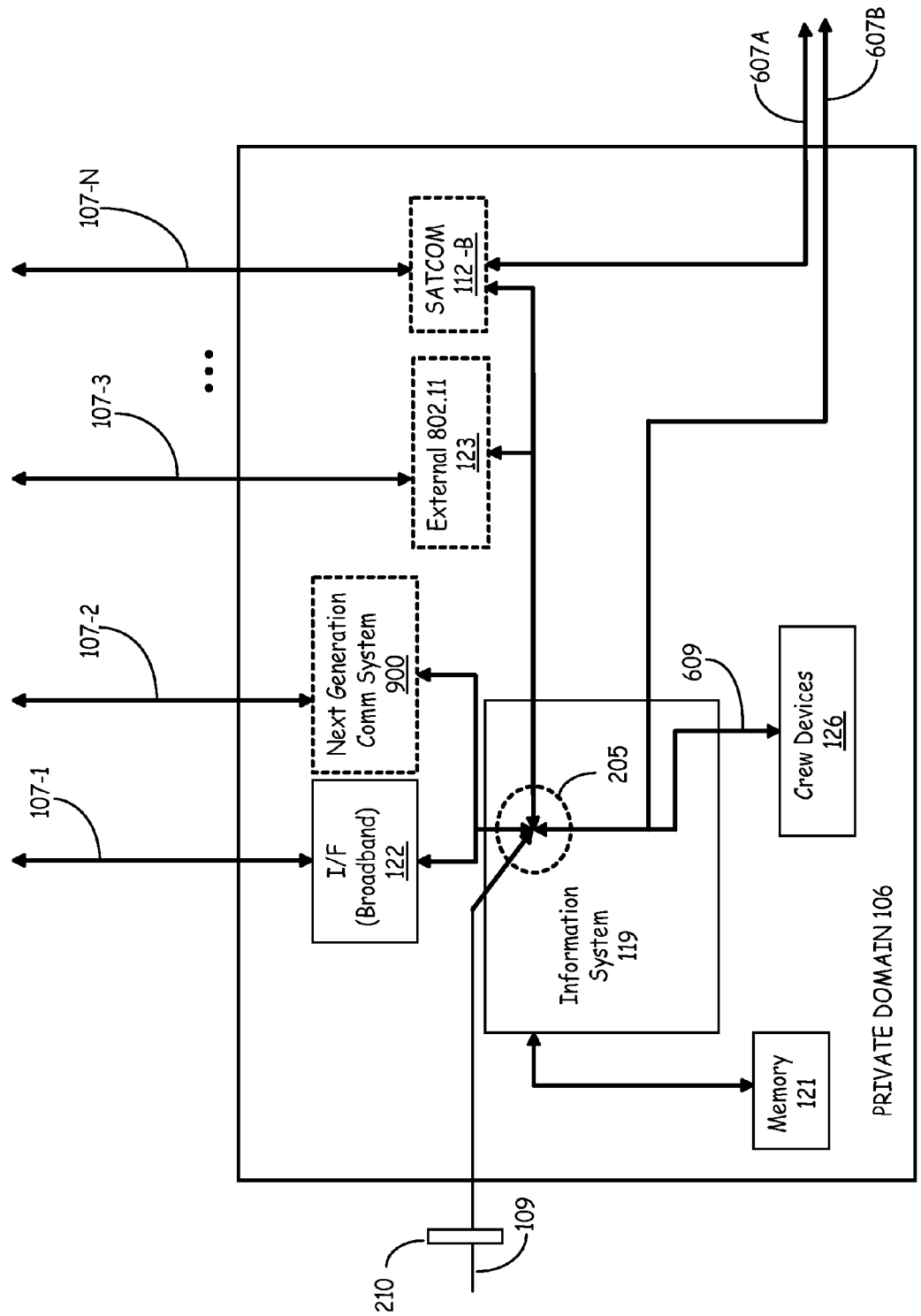
FIG. 3 shows a block diagram of a private domain in an aeronautical communication system in accordance with one embodiment of the present invention.
Figure 4:
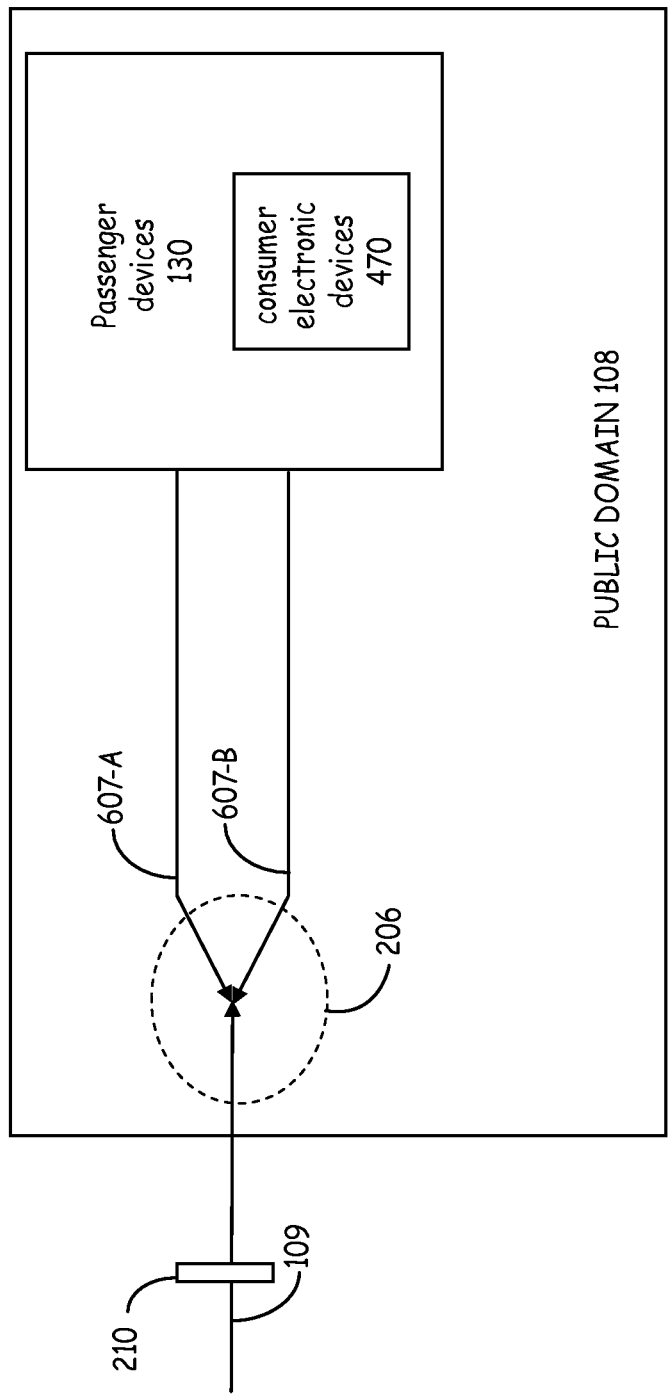
FIG. 4 shows a block diagram of a public domain in an aeronautical communication system in accordance with one embodiment of the present invention.

FIGS. 2-4 show expanded views in block diagrams for the closed domain 104, the private domain 106, and the public domain 108, respectively. FIG. 2 shows a block diagram of a closed domain 104 in an aeronautical communication system 90 (FIG. 1) in accordance with one embodiment of the present invention. The closed domain 104 includes a cockpit avionics system 400 in a cockpit 350. The cockpit avionics system 400 includes crew terminals 118 and cockpit avionics 402. The cockpit avionics 402 includes communications, navigation, and surveillance (CNS) systems 110, an avionics communications management function (CMF) 405, and aircraft operations and control 114, which includes, but is not limited to, systems such as the flight management computer, central maintenance computer, and an avionics control and maintenance system.

The avionics communications management function 405 includes hardware (HW) and software (SW) 406 and is communicatively coupled to the aircraft operations and control 114, the crew terminals 118, the printers 226, display 225, and the CNS systems 110. The aircraft operations and control 114 includes hardware (HW) and software (SW) 115. The aircraft operations and control 114 is communicatively coupled to the printers 226, display 225, the crew terminals 118, and the avionics communications management function 405.

Only the communications radio 201 is shown in detail in the CNS systems 110, although all three of the communications, navigation, and surveillance subsystems may have radio links (data links). Communication subsystems provide voice and data information, at least some of which is safety-of-flight and/or critical safety data. Such safety-of-flight and/or critical safety data is referred to herein as safety/security data. Navigation information aids the aircraft in knowing where it is in 3D space and time, while surveillance information helps the aircraft 103 recognize where other aircraft and objects (weather) are located relative to the aircraft's position. The navigation radios (N) and/or the surveillance radios (S) in the CNS systems 110 can also generate and/or receive safety-of-flight and/or critical safety data. In one implementation of this embodiment, at least a portion of the uplinked safety/security data is received by the cockpit avionics system 400 via the navigation radio (N) and/or surveillance radio (S).

As shown in FIG. 2, communications radio 201 includes hardware (HW) and software (SW) 202, and satellite communications (SATCOM) 112-A. In some embodiments, other SATCOM systems are in the private domain 104 and/or the public domain 106. The SATCOM 112-A data in the closed domain 104 is output to the avionics communications management function 405. In this depiction, SATCOM 112-A is a subset of the communications radio(s) 201 on the aircraft 103. Other communications radios might be VHF, HF, and/or L-Band. In one implementation of this embodiment, crew systems (not shown) are in the cockpit avionics system 400, the private domain 106, or both. Cockpit applications run on the CNS systems 110 (shown as software 202), the avionics communications management function 405 (shown as software 406), and the aircraft operations and control 114 (shown as software 115). The software 202, 406, and 115 include protocols to upload and download safety/security data.

Avionics communications management function 405 is a communications router for data messages that also formats messages for cockpit display 225 and cockpit printers 226 that are part of the aircraft operations and control subsystem. The cockpit 350 is communicatively coupled to receive data, including safety/security data, from antennas represented generally at 613 via communication links 105. For example, if the consumer data link is low bandwidth, the cockpit avionics system 400 may send the non-safety/non-security data via communication link 105 to the ground systems 300. In another implementation of this embodiment, the cockpit avionics system 400 is communicatively coupled to send safety/security data requiring low bandwidth, from antennas 613 via communication link 105. In this case, processors in the cockpit avionics system 400 execute software 202, 406 and 115 to determine if the bandwidth requirement of a message is low enough to output via the communication link 105.

A one-way firewall 210 is a dedicated appliance, or software running separately from the cockpit avionics system 400 or in the communications management function 405 and operable to receive data output from the cockpit avionics system. The one-way firewall 210 inspects data traffic passing through it, and denies throughput to any data from the private domain 106 to the closed domain 104 and also denies throughput to any data from the public domain 108 to the closed domain 104. The one-way firewall 210 inspects data traffic and passes data sent from the closed domain 104 to the private domain 106 and/or the public domain 108. As described herein the one-way firewall 210 can be a relatively inexpensive firewall, based on the configuration of the elements in the private domain 106 and in the public domain 108 with respect to the closed domain 104.

The configuration of the cockpit avionics system 400 can be different from the configuration shown herein. The illustrated configuration of the cockpit avionics system 400 is not meant to limit embodiments of the communication systems within the cockpit of aircraft.

FIG. 3 shows a block diagram of a private domain 106 in an aeronautical communication system 90 (FIG. 1) in accordance with one embodiment of the present invention. The private domain 106 includes the information system 119, which includes the routing region 205. The information system 119 functions as a router for the messages within the private domain 106. The information system 119 is communicatively coupled to the interface 122, which may be a broadband interface 122. Optionally, the private domain 106 can include next generation communication systems 900, an external IEEE 802.11-based-system 123, and SATCOM 112-B.

The safety/security data is received at the information system 119 from the closed domain 104 via communication link 109 and the one-way firewall 210. Cabin-crew data is received at the information system 119 from the crew devices 126 via communication link 609. Passenger data is received at the information system 119 from the public domain 108 via communication link 607-B. At least a portion of the cabin-crew data, and/or at least a portion of the passenger data, and the safety/security data input to the information system 119 is routed at the routing region 205 to be sent from the aircraft 103 (FIG. 1) via the interface 122 and the communication link 107-1. Additionally, another portion of the cabin-crew data and/or another portion of the passenger data is output from the information system 119 to be sent from the aircraft 103 via the next generation communication systems 900, an external IEEE 802.11-based-system 123, and SATCOM 112-B. In one implementation of this embodiment, the safety/security data received at the information system 119 from the closed domain 104 via communication link 109 and the one-way firewall 210 is sent from the aircraft 103 via the interface 122 and the communication link 107-1 without out any cabin-crew data or passenger data.

In another implementation of this embodiment, at least a portion of the cabin-crew data, and/or at least a portion of the passenger data, and at least a portion of the safety/security data input to the information system 119 is routed at the routing region 205 to be sent from the aircraft 103 (FIG. 1) via the the next generation communication systems 900, an external IEEE 802.11-based-system 123, and/or SATCOM 112-B. In yet another implementation of this embodiment, at least a portion of the safety/security data is sent from the aircraft 103 (FIG. 1) via the the next generation communication systems 900, an external IEEE 802.11-based-system 123, and/or SATCOM 112-B while no cabin-crew data or passenger data is sent from the aircraft 103.

As shown in FIG. 3, the communication link 607-B communicatively couples the information system 119 to the public domain 108, while the communication link 607-A is connected directly to SATCOM 112-B. The next generation communication systems 900 is communicatively coupled to receive data from the information system 119 and to output data from the private domain 106 via the consumer data link 107-2. The external IEEE 802. 11-based-system 123 is communicatively coupled to receive data from the information system 119 and to output data from the private domain 106 via the consumer data link 107-3. SATCOM 112-B is communicatively coupled to receive data from the information system 119 and to output data from the private domain 106 via the consumer data link 107-N.

In one implementation of this embodiment, the information system 119 is separate from the routing region 105. In such an embodiment, the information system 119 interfaces the crew devices 126 to the routing region 105. In another implementation of this embodiment, the routing region 205 serves as a manager of air-ground IP-based communications (a.k.a., MAGIC), which is a new routing function being contemplated by industry standards organizations such as AEEC.

Other communication systems and/or devices can be included in the private domain 106. The configuration of the devices and communication systems in the private domain 106 can be different from the configuration shown herein. The illustrated configuration of the private domain 106 is not meant to limit embodiments of the devices and communication systems within the private domain 106.

FIG. 4 shows a block diagram of a public domain 108 in an aeronautical communication system 90 in accordance with one embodiment of the present invention. The public domain 108 includes passenger devices 130, which can include consumer electronic devices 470. The consumer electronic devices 470 include laptops, cell phones, personal digital assistants, and future developed consumer electronic devices. The passenger devices 130 include displays for in-flight movies as well as the consumer electronic devices 470. As shown in FIG. 4, the routing region 206 is located in the public domain 108.

The passenger devices 130 generate passenger data. The passenger devices 130 are communicatively coupled to communication link 607-A and communication link 607-B. In one implementation of this embodiment, the communication link 607-A and the communication link 607-B are the same communication link 607.

The configuration of the devices in the private domain 108 can be different from the configuration shown herein. The illustrated configuration of the public domain 108 is not meant to limit embodiments of the devices within the private domain 108.

The one-way firewall 210 (FIGS. 1-4) is configured to regulate some of the flow of traffic between system or networks of different trust levels within the aircraft 103, so that safety/security data from the closed domain 104 is sent from the private domain 106 with some data private domain 106, and/or the public domain 108. As shown in FIG. 3, at least one of at least a portion of the passenger data received from the public domain 108 via the communication links 607-A and 607B and at least a portion of the cabin-crew data generated by crew devices 126 in the private domain 104 are routed by the information system 119 to the interface 122. In one implementation of this embodiment, the interface 122 is a broadband interface 122. In this case, the safety/security data is sent from the closed domain 104 of the aircraft 103 to ground systems 300 via a broad band consumer data link 107-1.

In this manner, at least one of at least a portion of the cabin-crew data, and at least a portion of the passenger data is transmitted from the aircraft 103 via one of the consumer data links 107(1-N) along with the safety/security data generated in the aircraft 103, while the cabin-crew data and the passenger data are prevented from entering the closed domain 104 by the one-way firewall 210. The consumer data links 107(1-N) are configured to send passenger data generated in the public domain 108 of the aircraft 103 to the ground systems 300 and to send cabin-crew data generated in the private domain 106 from the private domain 106 of the aircraft 103 to the ground systems 300, while the one-way firewall 210 prevents cabin-crew data and passenger data from entering the closed domain 104.

In one implementation of this embodiment, a memory 121 is communicatively coupled (as appropriate for the communication technology being implemented) to the information system 119 to store non-time critical messages on the aircraft until the aircraft 103 accesses a lowest cost data link, such as one of the consumer data links 107(1-N) from which to send the non-time critical messages from the private domain 106 and/or the public domain 108.

Figure 5:
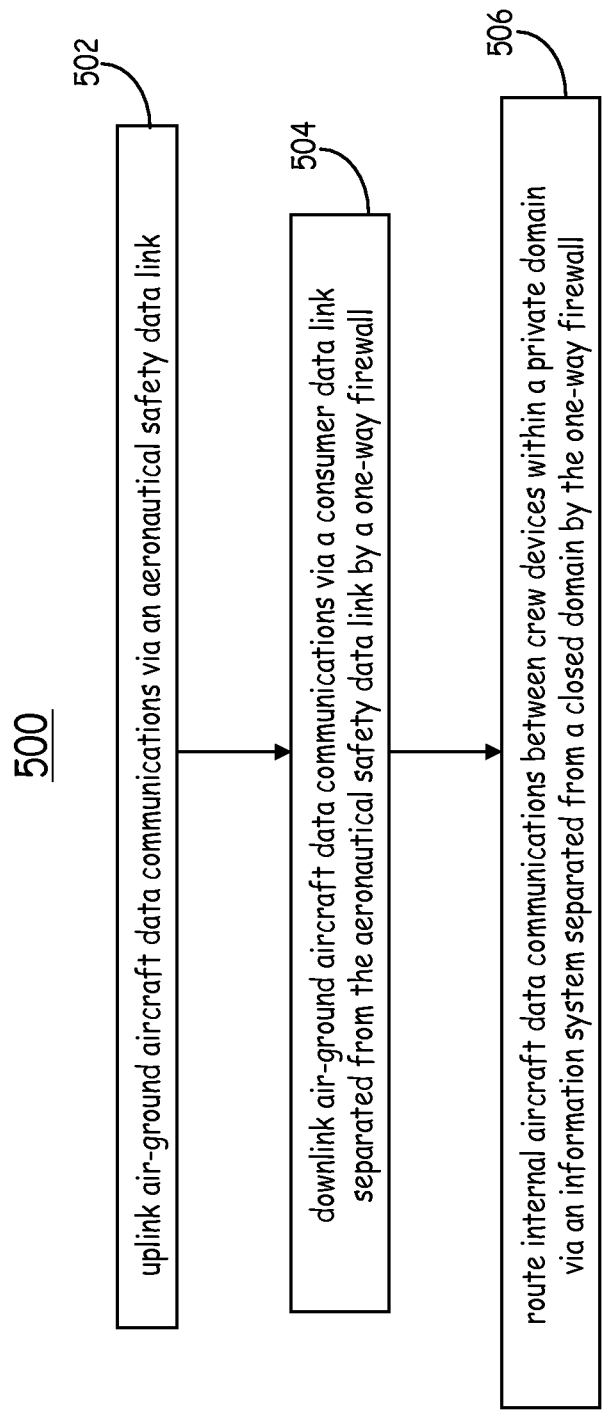
FIG. 5 is a flow diagram of a method to ensure secure and cost effective communication of aeronautical data to and from an aircraft in accordance with one embodiment of the present invention.

FIG. 5 is a flow diagram of a method 500 to ensure secure and cost effective communication of aeronautical data to and from an aircraft in accordance with one embodiment of the present invention. In one implementation of this embodiment, the secure and cost effective communication of aeronautical data to and from an aircraft is implemented by the aeronautical communication system 90 as described above with reference to FIGS. 1-4. The method 500 is described with reference to the aeronautical communication system 90 shown in FIGS. 1-4 although it is to be understood that method 500 can be implemented using other embodiments of the aeronautical communication system as is understandable by one skilled in the art who reads this document.

At block 502, air-ground aircraft data communications is uplinked via an aeronautical safety data link 105. The safety/security data is uplinked via the aeronautical safety data link 105 to the closed domain 104 by implementing uplink routing protocol in an aeronautical safety data link router 305 in ground systems 300 to send the safety/security data to the closed domain 104. At block 504, air-ground aircraft data communications is downlinked via one of the consumer data links 107(1-N) separated from the aeronautical safety data link 105 by a one-way firewall 210. The air-ground aircraft data communications downlinked via at least one of the consumer data links 107(1-N) includes safety/security data, at least a portion of cabin-crew data, and/or at least a portion of passenger data. The flow diagram of method 500 is intended to illustrate that the aeronautical communication system implementing method 500 is capable of implementing all the functions described at blocks 502, 504, and 506. The functions of linking and routing data described with reference to blocks 502, 504, and 506 are not necessarily occurring serially or in that order.

In one implementation of this embodiment, the functions of linking data described with reference to blocks 502, 504, and 506 occur simultaneously. In another implementation of this embodiment, functions of linking data described with reference to blocks 502, 504, and 506 occur in a different order.

In another implementation of this embodiment, the avionics communications management function 405 includes code or algorithms to determine a size of a message to be downlinked from a closed domain in the aircraft is less than a lower threshold size. In such an embodiment, when the message size is lower than the minimum threshold the message having a size less than the minimum threshold size is downlinked from the closed domain 104 via the aeronautical safety data link 105. In one implementation of this embodiment, the minimum threshold size is 221 bytes. In another implementation of this embodiment, the minimum threshold size is 144 bytes. In another implementation of this embodiment, the minimum threshold size is 2064 bytes. In yet another implementation of this embodiment, the minimum threshold size is variable and is configured based on airline policy.

At block 506, internal aircraft data communications are routed between at least one of crew devices 126 and equipment located within a private domain 106 via an information system 119. Additionally, internal aircraft data communications are routed between crew devices 126 located within a private domain 106 and passenger devices located in the public domain 108 via the information system 119. These internal aircraft data communications are prevented from entering the closed domain 104 by the one-way firewall 210. The internal aircraft data communications include cabin-crew data and/or passenger data.

Figure 6:
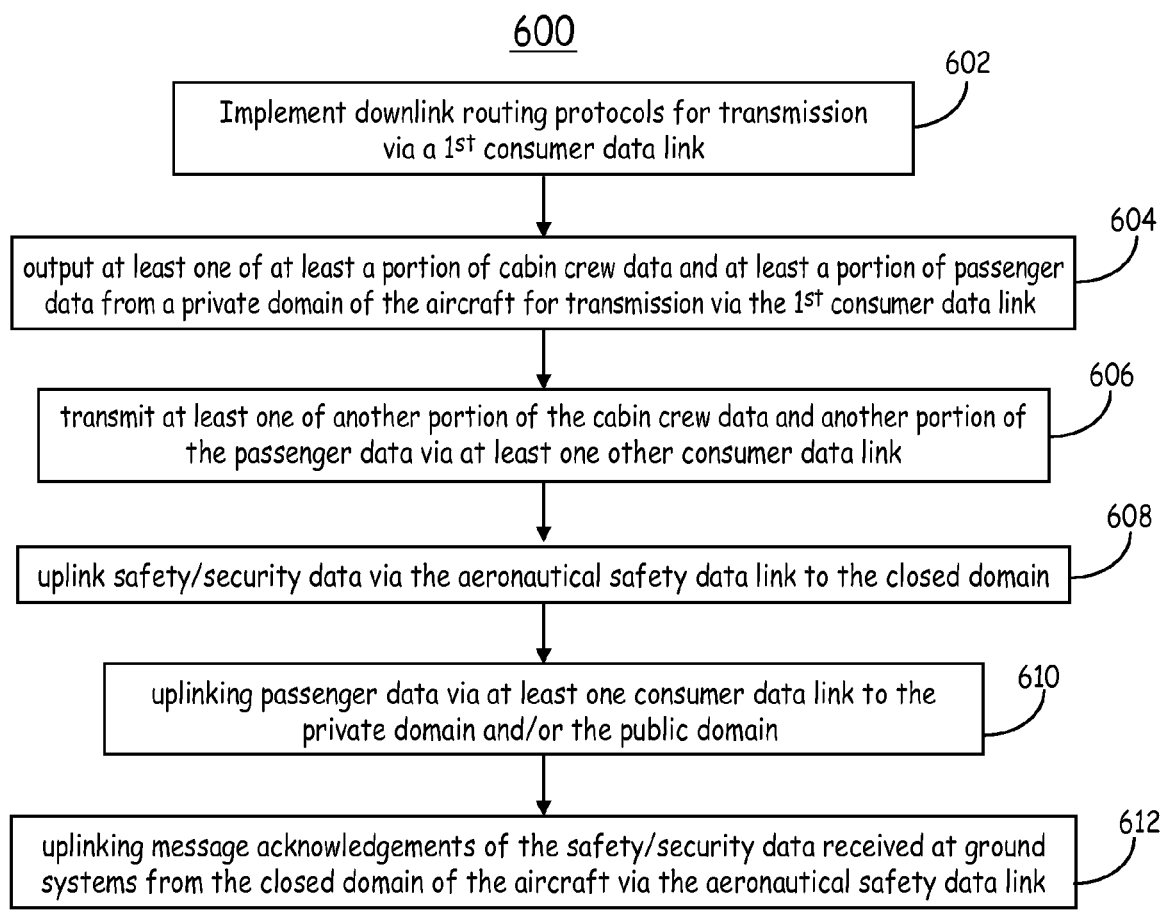
FIG. 6 is a flow diagram of a method to downlink and uplink air-ground aircraft data in accordance with one embodiment of the present invention.

FIG. 6 is a flow diagram of a method 600 to downlink and uplink air-ground aircraft data communications in accordance with one embodiment of the present invention. In one implementation of this embodiment, the downlinking and uplinking of the air-ground aircraft data communications are implemented by the aeronautical communication system 90 as described above with reference to FIGS. 1-4. The method 600 is described with reference to the aeronautical communication system 90 shown in FIGS. 1-4 although it is to be understood that method 600 can be implemented using other embodiments of the aeronautical communication system as is understandable by one skilled in the art who reads this document.

At block 602, downlink routing protocols are implemented to unidirectionally output safety/security data from the closed domain 104 of the aircraft 103 through the one-way firewall 210 for transmission via the consumer data link 107-1. In one implementation of this embodiment, downlink routing protocols are implemented in an avionics communications management function 405 to unidirectionally output safety/security data from the closed domain 104 of the aircraft 103 through the one-way firewall 210 for transmission via the consumer data link 107-1. The consumer data link 107-1 is also referred to herein as a "first consumer data link 107-1." At block 604, at least one of at least a portion of the cabin-crew data and at least a portion of the passenger data is output from a private domain 106 of the aircraft 103 for transmission via the first consumer data link 107-1. In this manner, the safety/security data, at least one of at least a portion of the cabin-crew data and at least a portion of the passenger data is transmitted from the aircraft 103 via the same consumer data link 107-1. The cabin-crew data and the passenger data are prevented from entering the closed domain by the one-way firewall 210.

At block 606, at least one of another portion of the cabin-crew data and another portion of the passenger data is transmitted via at least one other consumer data link 107(2-N) (i.e., a consumer data link that is not the first consumer data link 107-1) to one or more communication systems external to the aircraft 103. At block 608, safety/security data is uplinked via the aeronautical safety data link 105 to the closed domain 104. At block 610, passenger data is uplinked via at least one of the consumer data links 107(1-N) to the private domain 106 and/or the public domain 108. Uplink routing protocol is implemented in a consumer data link router 310 in ground systems 300 to send the passenger data to the private domain 106 and the public domain 108 in the aircraft 103. In one implementation of this embodiment, the passenger data is uplinked via the consumer data link 107-1 to the private domain 106 and the public domain 108. As defined herein passenger data (consumer data) includes data that is generated external to the aircraft 103 and that is sent to the passenger devices 130 as well as data that is generated in by the passenger devices 130 in the public domain 108 and sent to the private domain 104 and/or is sent external to the aircraft 103.

At block 612, message acknowledgements of the safety/security data received at ground systems 300 are uplinked to the closed domain 104 of the aircraft via the aeronautical safety data link 105. If the acknowledgement is not received within a configurable amount of time, the original message is retransmitted via the original communications path.

Figure 7:
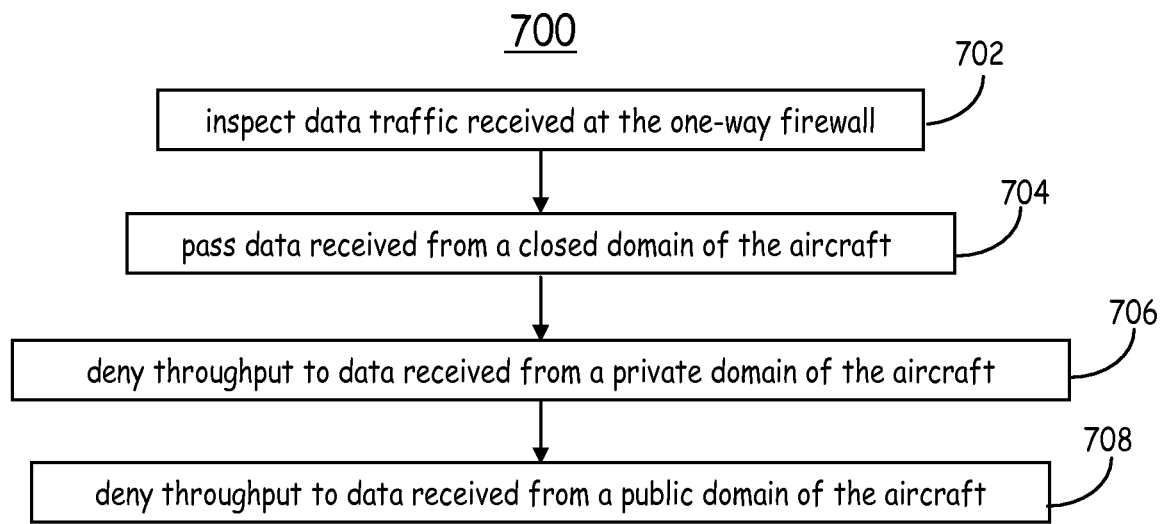
FIG. 7 is a flow diagram of a method to implement a one-way firewall in accordance with one embodiment of the present invention.

FIG. 7 is a flow diagram of a method to implement a one-way firewall in accordance with one embodiment of the present invention. The method 700 is described with reference to the one-way firewall 210 shown in FIGS. 1-4 although it is to be understood that method 700 can be implemented using the one-way firewall 210 in other configurations of the aeronautical communication systems (including aeronautical communication systems that include systems yet to be developed) as is understandable by one skilled in the art who reads this document.

At block 702, data traffic that is received at the one-way firewall 210 is inspected. At block 704, data received from a closed domain 104 of the aircraft 103 is passed based on the inspection by the one-way firewall 210. At block 706, throughput is denied to data received from a private domain 106 of the aircraft 103 based on the inspection by the one-way firewall 210. At block 708, throughput is denied to data received from a public domain of the aircraft 103 based on the inspection by the one-way firewall 210.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of ensuring secure and cost effective communication of aeronautical data to and from an aircraft, the method comprising:
   uplinking air-ground aircraft data communications via an aeronautical safety data link, wherein the aeronautical safety data link is a communications link licensed and/or regulated to exchange safety/security data between the aircraft and at least one of a mobile system and a fixed system;
   implementing downlink routing protocols to output the safety/security data from a closed domain of the aircraft through a one-way firewall and through at least one of a private domain of the aircraft and a public domain of the aircraft; and
   downlinking air-ground aircraft data communications, including the safety/security data, from the respective at least one of the private domain of the aircraft and the public domain of the aircraft to a ground system via a consumer data link separated from the aeronautical safety data link by the one-way firewall.

2. The method of claim 1, wherein uplinking air-ground aircraft data communications via the aeronautical safety data link comprises:
   uplinking message acknowledgements of the safety/security data received at ground systems from the closed domain of the aircraft via the aeronautical safety data link.

3. The method of claim 1, further comprising:
   outputting cabin-crew data from the private domain of the aircraft; and
   outputting passenger data from the public domain of the aircraft, wherein the safety/security data, at least one of at least a portion of the cabin-crew data, and at least a portion of the passenger data is transmitted from the aircraft via the consumer data link, wherein the cabin-crew data and the passenger data are prevented from entering the closed domain by the one-way firewall.

4. The method of claim 1, wherein the consumer data link is a first consumer data link, the method further comprising:
transmitting at least one of another portion of the cabin-crew data and another portion of the passenger data via at least one other consumer data link.

5. The method of claim 1, wherein uplinking air-ground aircraft data communications via an aeronautical safety data link comprises:
uplinking safety/security data via the aeronautical safety data link to the closed domain.

6. The method of claim 5, wherein uplinking the safety/security data via the aeronautical safety data link to the closed domain comprises implementing uplink routing protocol in an aeronautical safety data link router in ground systems to send the safety/security data to the closed domain.

7. The method of claim 1, further comprising:
uplinking passenger data via the consumer data link to at least one of the private domain and the public domain.

8. The method of claim 1, further comprising:
routing internal aircraft data communications between crew devices within the private domain via an information system, wherein the internal aircraft data communications are prevented from entering the closed domain by the one-way firewall.

9. The method of claim 1, further comprising:
inspecting data traffic received at the one-way firewall;
passing data received from the closed domain of the aircraft based on the inspecting;
denying throughput to data received from the private domain of the aircraft based on the inspecting; and
denying throughput to data received from the public domain of the aircraft based on the inspecting.

10. The method of claim 1, further comprising:
determining a size of a message to be downlinked from the closed domain in the aircraft is less than a minimum threshold size; and
downlinking the message having a size less than the minimum threshold size from the closed domain via the aeronautical safety data link.

11. An aeronautical communication system comprising:
an avionics communications management function; and
a one-way firewall, wherein the avionics communications management function is executable by a processor configured to execute downlink routing protocols to send safety/security data from a closed domain of an aircraft, through a one-way firewall and through at least one of a private domain of the aircraft and a public domain of the aircraft, to ground systems via a consumer data link, the avionics communications management function further configured to execute uplinking routing protocols to receive safety/security data at the closed domain via an aeronautical safety data link, wherein the aeronautical safety data link is a communications link licensed and/or regulated to exchange the safety/security data between the aircraft and at least one of a mobile system and a fixed system, and
wherein the one-way firewall is communicatively coupled to pass the safety/security data output from the closed domain, and the one-way firewall is configured to prevent data from entering the closed domain when the data is at least one of uplinked on the consumer data link to the private domain, and uplinked on the consumer data link to the public domain.

12. The aeronautical communication system of claim 11, further comprising:
the ground systems, wherein the ground systems include:
a consumer data link router configured to receive the safety/security data output from the closed domain via the consumer data link,
a ground communications peer communicatively coupled to the consumer data link router, and
an aeronautical safety data link router communicatively coupled to the ground communications peer, the aeronautical safety data link router configured to send safety/security data to the avionics communications management function via the aeronautical safety data link.

13. The aeronautical communication system of claim 11, wherein the consumer data link is further configured to send at least one of passenger data from the public domain of the aircraft to the ground systems and cabin-crew data from the private domain of the aircraft to the ground systems, wherein the one-way firewall prevents the cabin-crew data and the passenger data from entering the closed domain.

14. The aeronautical communication system of claim 11, wherein the consumer data link is a broad band consumer data link.

15. The aeronautical communication system of claim 11, further comprising:
a memory to store non-time critical messages on the aircraft until the aircraft accesses a lowest cost data link.

16. An aeronautical communication system comprising:
ground systems, wherein the ground systems include:
a consumer data link router configured to receive via a consumer data link the safety/security data output from a closed domain in an aircraft via the consumer data link;
a ground communications peer communicatively coupled to the consumer data link router, the ground communications peer configured to send consumer data to at least one of a private domain in the aircraft and a public domain in the aircraft via the consumer data link; and
an aeronautical safety data link router communicatively coupled to the ground communications peer, the aeronautical safety data link router configured to send safety/security data to an avionics communications management function in the closed domain of the aircraft via an aeronautical safety data link, wherein the aeronautical safety data link is a communications link licensed and/or regulated to exchange the safety/security data between the aircraft and at least one of a mobile system and a fixed system; and
at least one processor to execute software in the consumer data link router, the ground communications peer, and the aeronautical safety data link router.

17. The aeronautical communication system of claim 16, further comprising:
the avionics communications management function in the aircraft configured to execute downlink routing protocols to output safety/security data from the closed domain of the aircraft via the consumer data link and configured to execute uplinking routing protocols to receive the safety/security data at the closed domain via the aeronautical safety data link; and
a one-way firewall communicatively coupled to receive the safety/security data output from the closed domain, the one-way firewall configured to prevent data from entering the closed domain, when the data is at least one of uplinked on the consumer data link to the private domain, and uplinked on the consumer data link to the public domain.

18. The aeronautical communication system of claim 17, wherein the one-way firewall is further configured to prevent internal aircraft data communications sent between crew devices within the private domain from entering the closed domain.

19. The aeronautical communication system of claim 17, wherein the one-way firewall is further configured to prevent cabin-crew data and passenger data from entering the closed domain.

20. A system to ensure secure and cost effective communication of aeronautical data to and from an aircraft, the system comprising:
   means for uplinking air-ground aircraft data communications, wherein the means for uplinking is licensed and/or regulated to exchange safety/security data between the aircraft and at least one of a mobile system and a fixed system;
   means for implementing downlink routing protocols to output the safety/security data from a closed domain of the aircraft through a one-way firewall and through at least one of a private domain of the aircraft and a public domain of the aircraft; and
   means for downlinking air-ground aircraft data communications, including the safety/security data, from the respective at least one of the private domain of the aircraft and the public domain of the aircraft to a ground system, the means for downlinking air-ground aircraft data communications being separated from the means for uplinking air-ground aircraft data communications by the one-way firewall.

21. The system of claim 20, further comprising:
   means for outputting cabin-crew data from the private domain of the aircraft; and
   means for outputting passenger data from the public domain of the aircraft, wherein the safety/security data, at least one of at least a portion of the cabin-crew data, and at least a portion of the passenger data is transmitted from the aircraft via the means for downlinking air-ground aircraft data communications, and wherein the cabin-crew data and the passenger data are prevented from entering the closed domain.

22. The system of claim 20, further comprising:
   means for routing internal aircraft data communications between crew devices within the private domain, wherein the internal aircraft data communications are prevented from entering the closed domain by the one-way firewall.

23. The system of claim 20, further comprising:
   means for inspecting data traffic received at the one-way firewall;
   means for passing data received from the closed domain of the aircraft based on the inspecting;
   means for denying throughput to data received from the private domain of the aircraft based on the means for inspecting; and
   means for denying throughput to data received from the public domain of the aircraft based on the means for inspecting.

24. The system of claim 20, further comprising:
   means for determining a size of a message to be downlinked from the closed domain in the aircraft is less than a minimum threshold size; and
   means for downlinking the message having a size less than the minimum threshold size from the closed domain via the means for uplinking air-ground aircraft data communications.

* * * * *